Feb. 25, 1964 H. F. MEYER 3,122,310

PROGRAMMER

Filed June 13, 1962 12 Sheets-Sheet 1

INVENTOR

HENRY F. MEYER

BY Walter C. Wheeler

ATTORNEY

Feb. 25, 1964 H. F. MEYER 3,122,310

PROGRAMMER

Filed June 13, 1962 12 Sheets-Sheet 2

INVENTOR

HENRY F. MEYER

BY Walter C. Wheeler

ATTORNEY

Feb. 25, 1964 H. F. MEYER 3,122,310

PROGRAMMER

Filed June 13, 1962 12 Sheets-Sheet 3

INVENTOR

HENRY F. MEYER

BY Walter C. Wheeler

ATTORNEY

INVENTOR
HENRY F. MEYER

BY Walter C. Wheeler
ATTORNEY

INVENTOR
HENRY F. MEYER

BY Walter C. Wheeler
ATTORNEY

INVENTOR
HENRY F. MEYER

BY Walter C. Wheeler
ATTORNEY

INVENTOR
HENRY F. MEYER

BY Walter C. Wheeler
ATTORNEY

Feb. 25, 1964 H. F. MEYER 3,122,310

PROGRAMMER

Filed June 13, 1962 12 Sheets-Sheet 8

INVENTOR
HENRY F. MEYER

BY Walter C. Wheeler
ATTORNEY

Feb. 25, 1964 H. F. MEYER 3,122,310

PROGRAMMER

Filed June 13, 1962 12 Sheets-Sheet 9

INVENTOR
HENRY F. MEYER

BY Walter C. Wheeler
ATTORNEY

INVENTOR
HENRY F. MEYER
BY Walter C. Wheeler
ATTORNEY

PROGRAMMER

INVENTOR
HENRY F. MEYER

BY Walter C. Wheeler
ATTORNEY

Feb. 25, 1964 H. F. MEYER 3,122,310

PROGRAMMER

Filed June 13, 1962 12 Sheets-Sheet 12

INVENTOR
HENRY F. MEYER

BY Walter C. Wheeler
ATTORNEY

United States Patent Office 3,122,310

Patented Feb. 25, 1964

3,122,310
PROGRAMMER

Henry F. Meyer, Cortland, N.Y., assignor, by mesne assignments, to The Monarch Machine Tool Company, Sidney, Ohio, a corporation of Ohio Filed June 13, 1962, Ser. No. 202,206
5 Claims. (Cl. 234—80)

Figure 1:
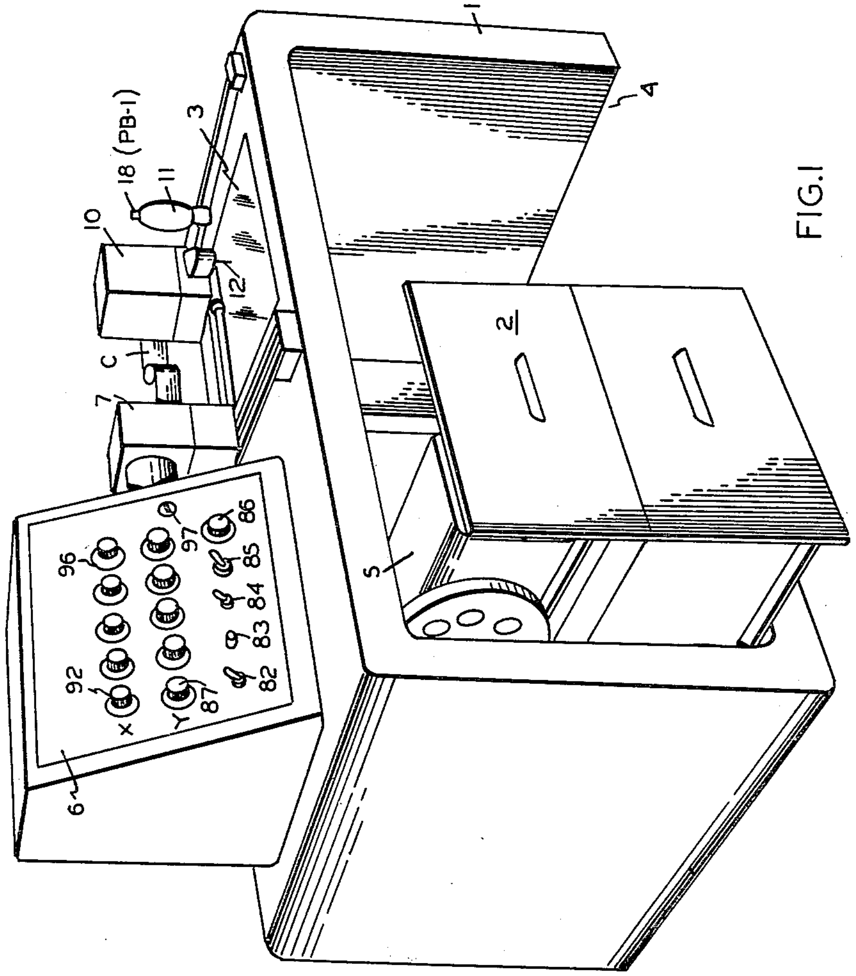

This invention relates to programming devices and is useful for making perforated memory devices in the form of perforated cards or tapes which may be perforated according to a standardized numerical positioning code. Such devices for storing information are useful for controlling the operation of machines and for other purposes.

Heretofore cards or tapes for the purposes indicated were prepared by a laborious, time consuming and indirect method. For example in preparing a perforated tape for duplicating the drilled holes in a printed circuit board, the drawing or lay-out of the holes were first accurately dimensionally coordinated, then a planning sheet was prepared according to these coordinates and finally a tape was perforated in accordance with the planning sheet. The method left much to be desired from an operational standpoint.

It is among the objects of this invention to provide means for producing perforated memory devices of the kind indicated directly from a drawn lay-out, or from a perforated prototype or pattern.

Another object is to provide means for simplifying the operation of preparing cards or tapes of the kind, and to provide for the avoidance of errors in such operations.

Figure 2:
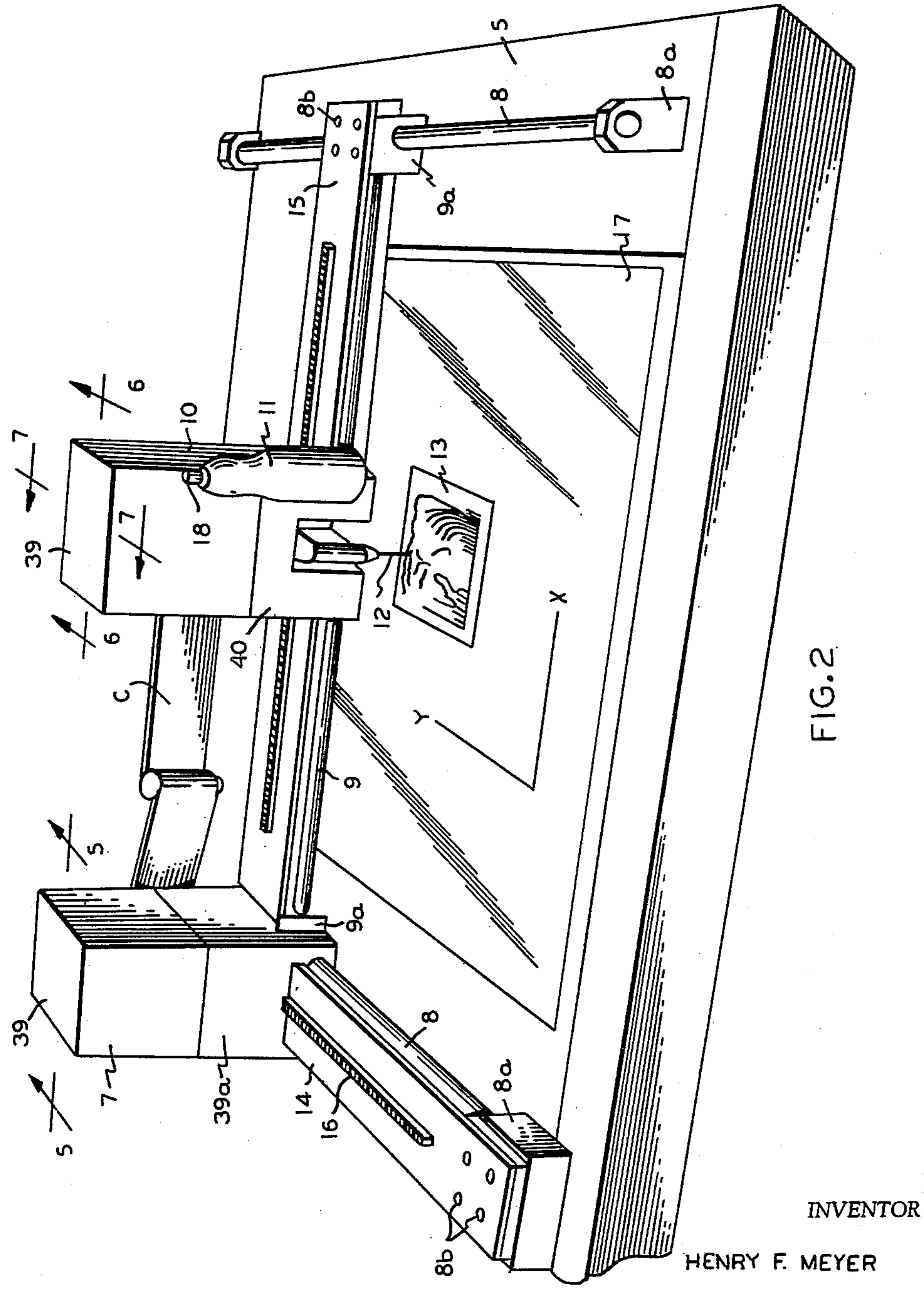
Figure 3:
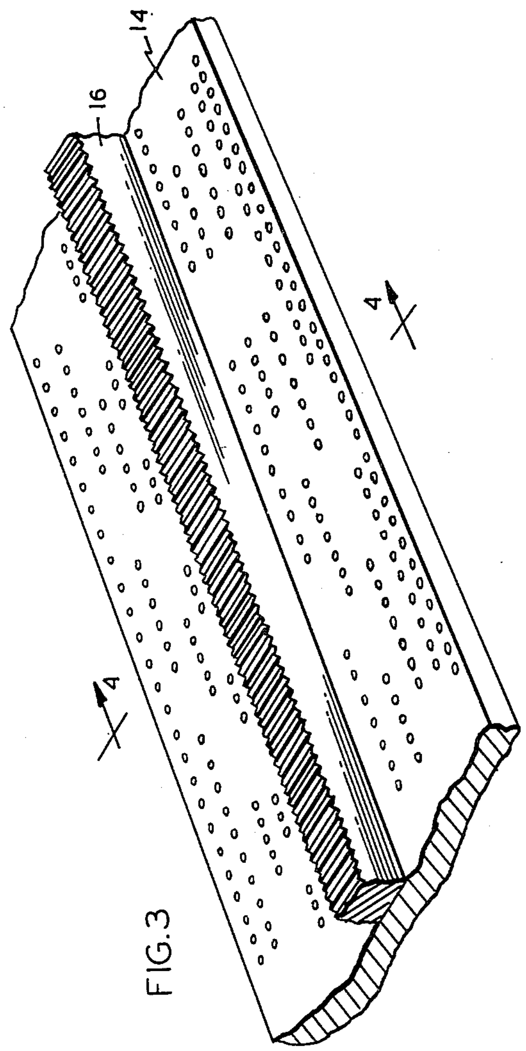

Other objects will become apparent from the description of the invention which is made with reference to the drawings constituting a part hereof which refer to the means for the preparation of a tape for directing a boring machine, in which like numerals refer to like parts, in which FIG. 1 is a front view in perspective of an assembly comprising a desk and a programming device, FIG. 2 is an enlarged view in perspective of the operator's station which comprises certain manually and certain electrically operated details, FIG. 3 is a perspective view of a template or matrix in which master perforations are provided, and upon which a rack is mounted for accurately locating the positions of certain power operated push rods, certain ones of which are caused to register with the perforations which represent the information to be stored.

Figure 4:
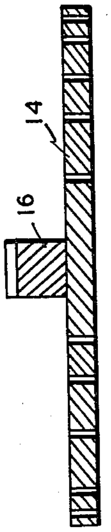
Figure 5:
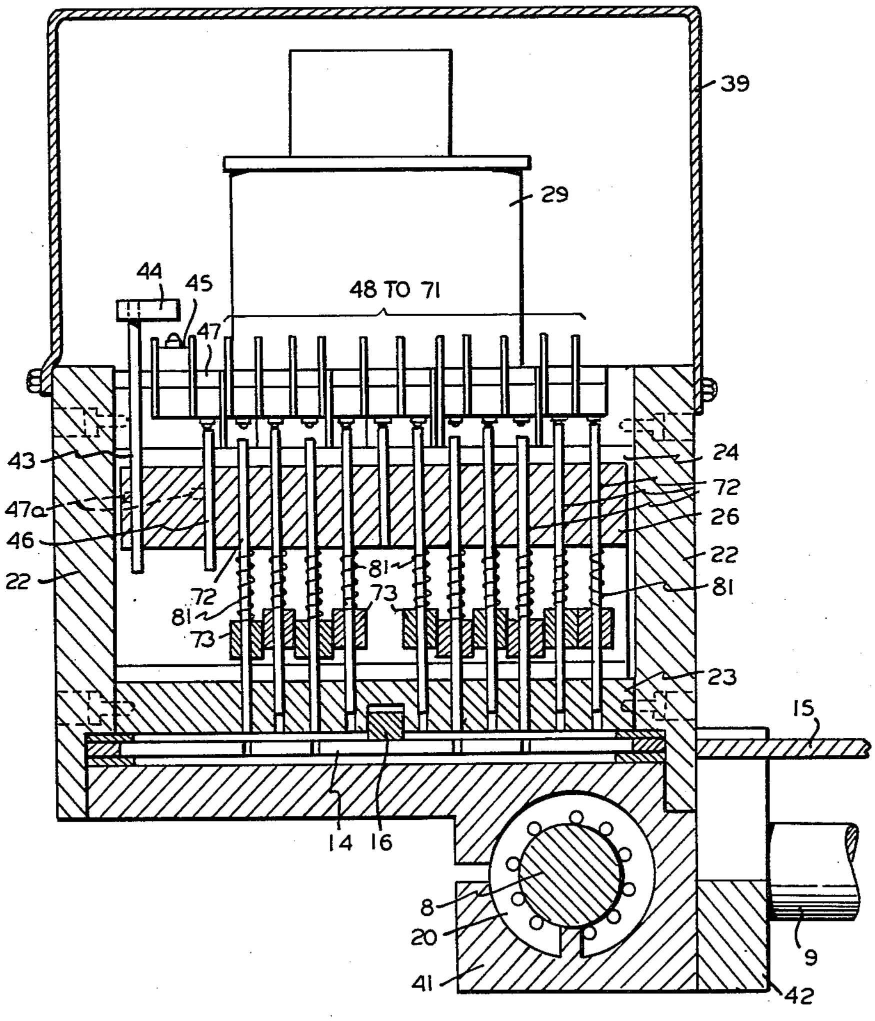
Figure 6:
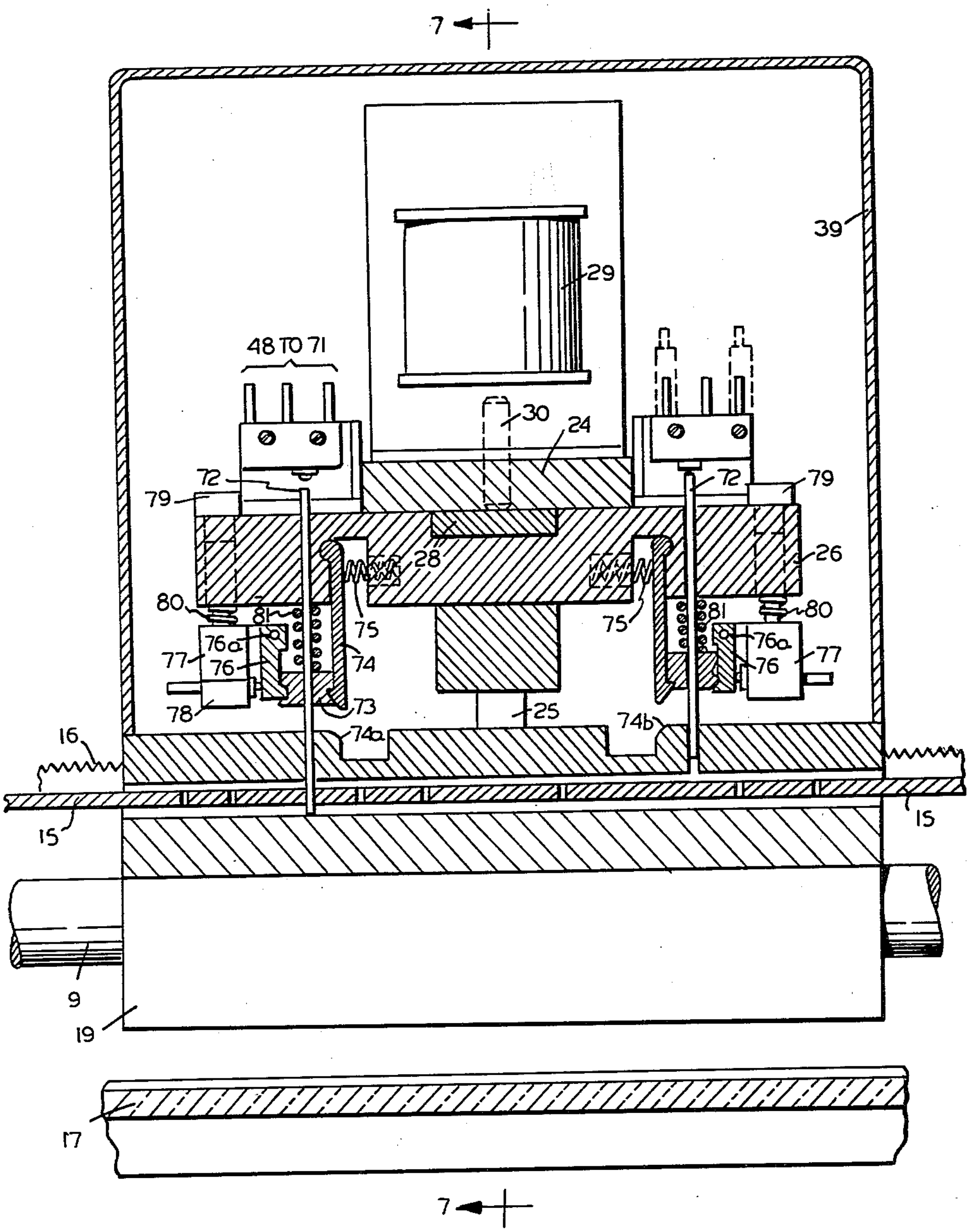
Figure 7:
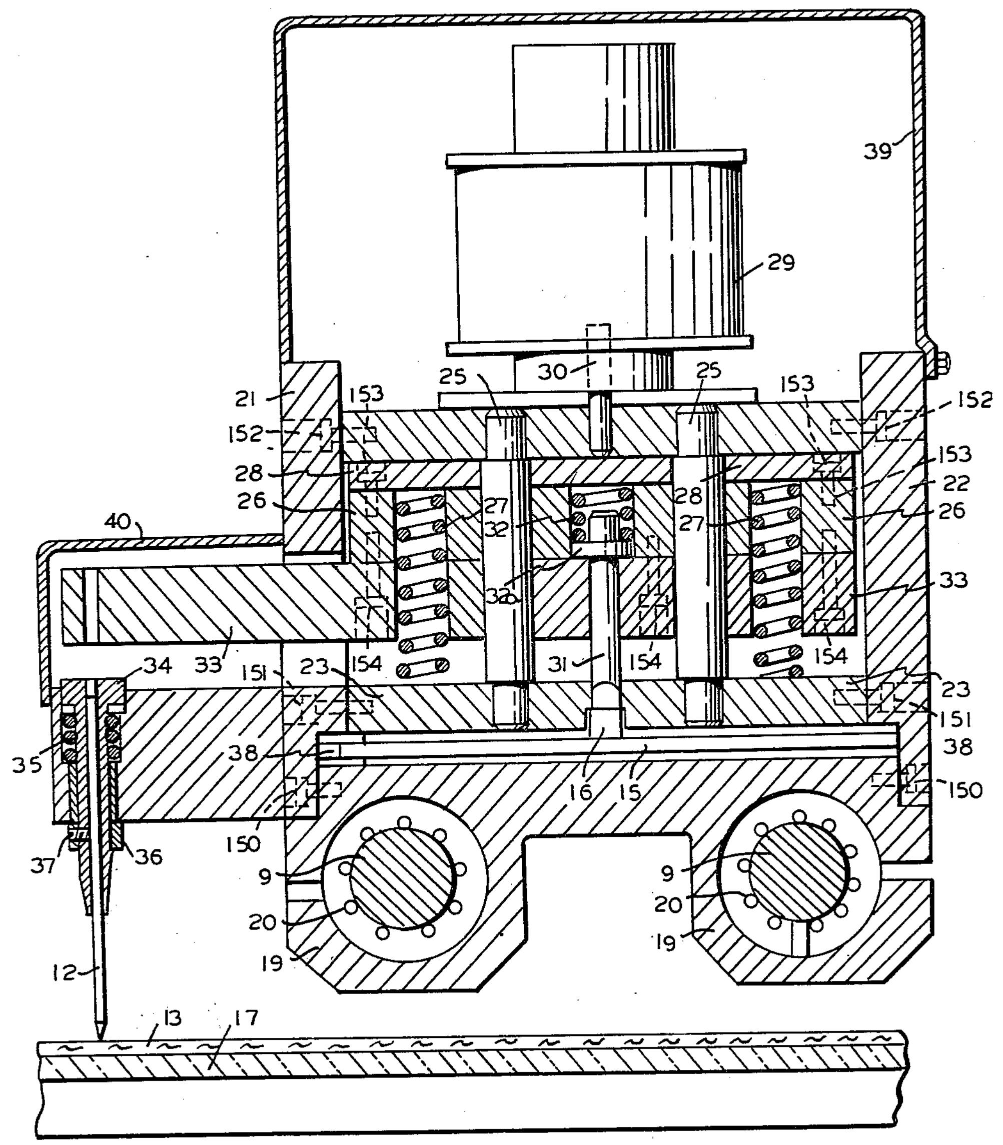
Figure 8:
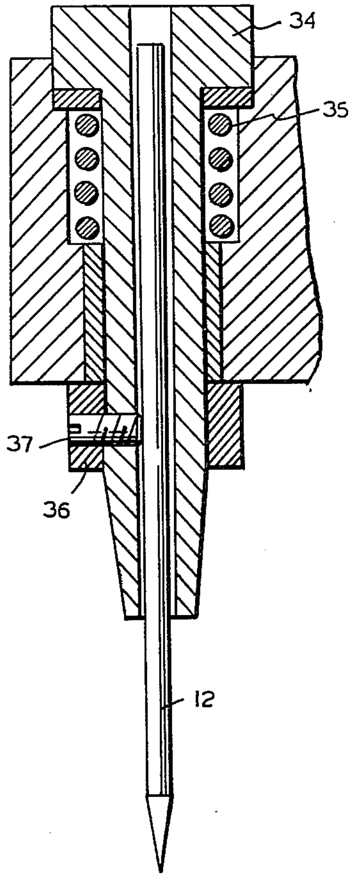
Figure 9:
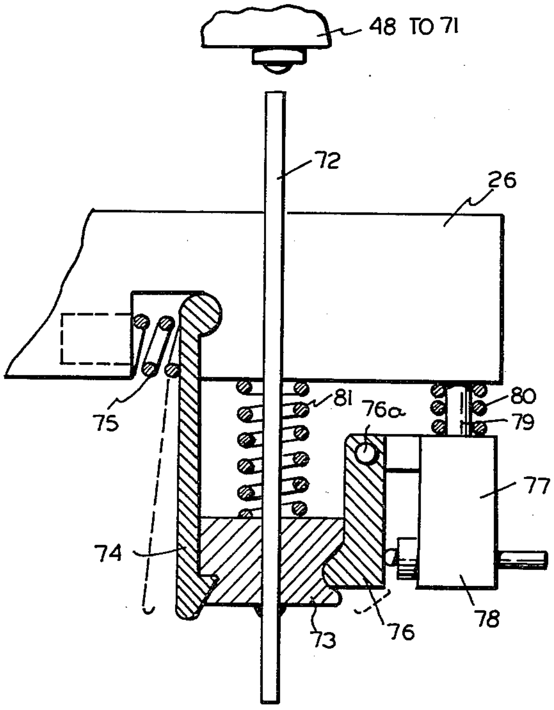
Figure 10:
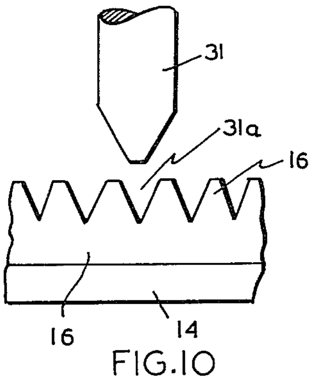
Figure 11:
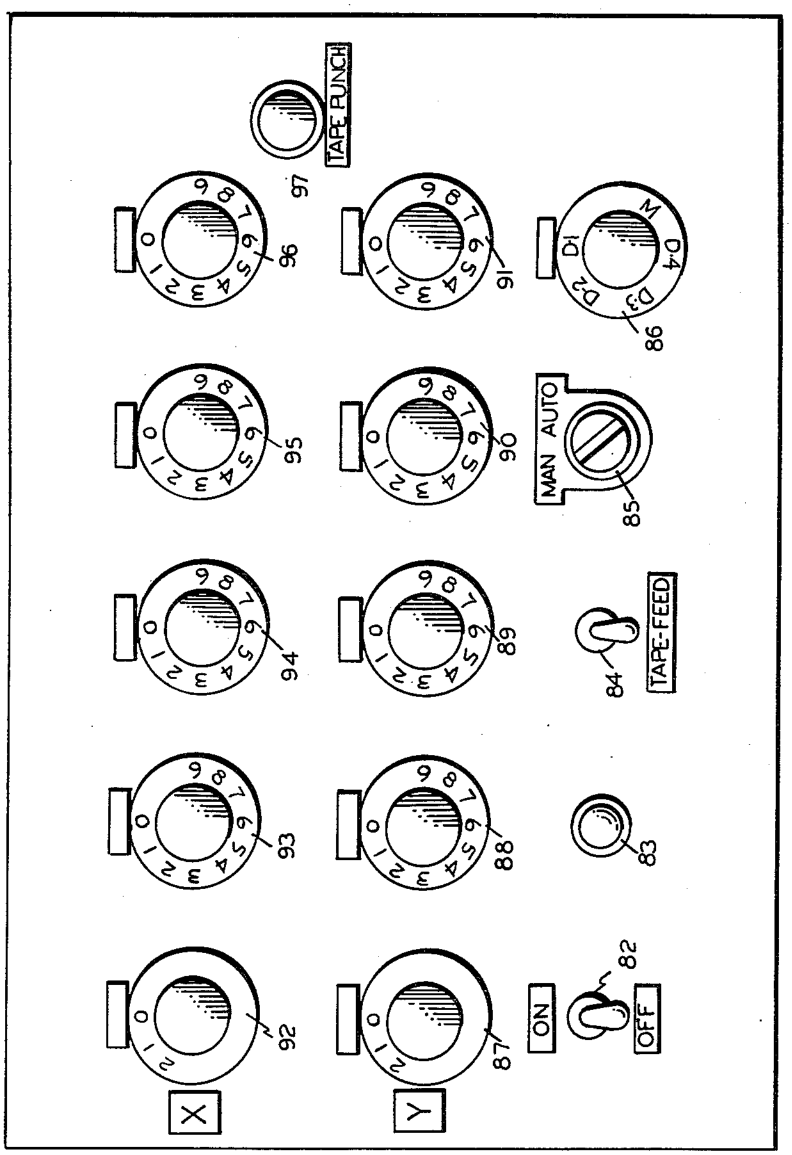

FIG. 4 is a cross sectional view of the template and rack taken along the line IV—IV of FIG. 3, FIG. 5 is a partial front elevational and partial cross sectional view taken along the line V—V of FIG. 2, showing one of the push rod and switch assemblies, FIG. 6 is a partial front elevational and partial cross sectional view of the other push rod and switch assembly taken along the line VI—VI of FIG. 2, FIG. 7 is a partial side elevational and partial cross sectional view of said other switch assembly of FIG. 6, taken along the line VII—VII of FIG. 2, showing the pointer or stylus in detail, FIG. 8 is an enlarged partial side elevational and partial cross sectional view of the stylus assembly, FIG. 9 is an enlarged view of a switch push rod and its mounting which comprises a part of that shown in FIG. 6, FIG. 10 is an enlarged partial elevational view of the locating push rod assembly, FIG. 11 is an enlarged front elevational view of the operators console shown in FIG. 1 identifying various switch operators and indicators, and FIGS. 12A, 12B, 12C and 12D are schematic wiring diagrams employed in connection with the operation of the device.

Referring to FIG. 1, devices made in accordance with the invention may be assembled conveniently in and on a bench or desk 1 having a drawer 2 or compartment at one end and an operator's area or station 3 at the other end where a knee-hole space 4 may be provided. An electric tape perforating device 5 is contained in the sliding drawer 2. On top and at one end of the desk is a console 6 comprising numerous switches, push buttons, indicator lamps and electrical connectors which will be described hereinbelow. At one side of the console over the knee-hole is mounted a manually operable carriage or assembly comprising the "Y" axis head assembly 7 and the "X" axis head assembly 10. The "Y" axis head assembly is mounted to reciprocate on ball bearing mounts along the rods 8 which are elevated above the table top and supported from the mounts 8*a*. The "X" axis head assembly is similarly mounted on a pair of rods 9. The "X" axis head assembly is mounted to reciprocate at right angle to the "Y" axis head along the rods 9 which are retained in the mounts 9*a* in a plane parallel with the table top. The "X" head assembly 10 comprises an operating handle 11 and a locating stylus or pointer 12 which is sharpened. Under the pointer 12 a drawing representing a printed circuit board is shown as numeral 13.

The "Y" axis assembly comprises a template 14 and the "X" axis assembly comprises a similarly perforated template 15, mounted on the carriage 90 degrees apart and in the same plane. The templates 14 and 15 are accurately perforated in accordance with the numerical positioning code employed and contain all the perforations needed to convey to a punched tape, or other intelligence storage piece the information desired. In FIG. 3 is shown a row of equally spaced feeder holes and eight rows of numerical positioning perforations. The numerical positioning perforations are spaced apart equally in channels along the template. The feeder holes are in a continuous channel and are sized and positioned to accommodate the device to be employed for advancing the tape from one recording position to the next. The templates are suitably mounted on their respective carriages as by the screws 8*b*, and they constitute the master templates for their respective axes.

Positioning racks 16 are mounted on the tops and longitudinally along the master templates. The racks are accurately cut and mounted on the master templates so that their teeth are in register with the channels of the templates. The "Y" and "X" head assemblies are thus enabled to reciprocate along their respective axes above the master templates and racks so that the operator is enabled to manually position the pointer 12 over any and all points on the drawing 13 to be recorded on the intelligence storage piece. Means for correcting the manually positioned assemblies 7 and 10 are provided within these assemblies for engaging the racks 16 as will appear in the more detailed description thereof. The racks operate to locate these assemblies accurately before the final reading is made.

The top of the desk is cut away and a light transmitting inset, or glass plate is mounted in the opening. Then a resilient light translucent cushion or sheet, such as a rubber sheet is mounted over the glass top, and a light source (not shown) is mounted in the knee-hole space. Each time a point in the drawing 13 is programmed means are provided to move the stylus 12 downward to an ultimate lowered position where the sharpened point will penetrate the drawing, thereby creating a bright spot, thereby distinguishing the programmed points from those to be programmed. On the top of the manually operated handle 11 is mounted a push button 18, also indicated on circuit diagrams as PB-1. By depressing this button electrically operated means are initiated for effecting the final positioning of the heads 7 and 10 and bring them accurately into register with the perforations. As illustrated in FIGS. 7 and 10 when the pin 31 is advanced by lowering the head 33, the wedged end of the pin enters a notch 31*a* which is more or less accurately disposed thereunder by manual operation of the operator. The downward movement of the wedge to the bottom of the notch moves the heads into the accurately corrected position. In cases where the points on the drawing 13 to be recorded are closer together than the spacing provided by the spacing of the channels or rows in the templates, the drawing or master pattern is scaled to larger proportion.

Referring to FIGS. 5 to 10 within the assemblies 7 and 10 are mounted the push rods 72 which extend endwise and correspond in number and position to the perforations in the templates. They serve to operate individual switches in circuits which transmit the positional intelligence to the intelligence recording device 5. Associated in these assemblies are comparing levers and switch assemblies which will allow the positional information to be transferred to the card or tape only when the information is different than that already transmitted. This means shortens the programming operation considerably since all the positions in a given axis can be recorded without repeating on the memory storage device the information for that axis. All assemblies within the "Y" head 7 and the "X" head 10 are identical, except that the "X" head also comprises the manual operating handle 11 and the sharpened locating stylus 12.

Referring to FIG. 7 the "X" axis carriage 19 is provided with the ball bushings 20 and mounted on rods 9. Front and back plates 21 and 22 are fastened in upright positions on opposite sides of carriage 19 by screws 150, upon and between which the bottom pin guide 23 is mounted and secured by screws 151 and the top yoke 24 is secured by the screws 152. Two guide pins 25 are mounted between guide plate 23 and yoke 24, the shoulders on the guide pins serving as spacers. The pin slide assembly reciprocates up and down on these pins in the operation of sensing a new position. The pin slide assembly is a carriage comprising an intermediate member 26 bored to mount the spring 27 therewithin, the slide way for the pins 25 and the receptacle for the spring 32 and the abutting collar 32*a*. The cover plate 28 is mounted on the intermediate member 26 and abuts the top yoke 24 in the extreme upward position. The cover plate is secured to the intermediate member 26 by screws 153. On the bottom of intermediate member 26 the stylus operator 33 is mounted by screws 154. The spring 32 is mounted in the central receptacle between the top plate 28 and the shoulder 32*a* of the pin 31, and the springs 27 are mounted between the cover plate 28 and the bottom pin guide 23. The locating pin 31 is mounted to slide within the central opening in the stylus operator 33 and to extend into a corresponding central opening in the pin guide 23. The pin slide carriage is fitted accurately to reciprocate vertically within the opening confined within the plates 21, 22, 23 and 24. The lower end of the pin 31 is wedge shaped to conform to the V-shaped openings (FIG. 10) between the teeth on top of the racks.

The pin slide carriage is moved downwardly by energizing the electric solenoid 29 which is mounted on top of the yoke 24. The solenoid is energized after the operator has manually located a point on the drawing to be recorded. The solenoid circuit is energized then by pressing the button 18 mounted on top of the handle 11. The energized solenoid operates to lower the carriage and push rod 30 downwardly. The rod 30 is slidingly mounted in the top yoke 24 and bears on the top of the pin slide carriage, so that upon energizing the solenoid the carriage is lowered against the springs 27 carrying along the locating pin 31 which proceeds accordingly through the opening in plate 23. It will now be clear that clearances are provided which produce a sequence of operations. Firstly the positions of the assemblies 7 and 10 are corrected and thereafter a pin hole is made in the drawing 13 to indicate that the point has been sensed. Accordingly sufficient downward movement of the carriage advances the wedge shaped end of the locating pins 31 into the V-shaped openings between the teeth of each of the racks 14 and 15, thereby correcting the manual positioning of the "X" and "Y" head assemblies so that the carriage and push rod assemblies will be accurately oriented with respect to the openings in the templates 14 and 15. In this position the pin 31 is floating on the compressed spring 32 and the carriage is floating on the springs 27. The solenoid continues to move the carriage and plate 33 downward, firstly into contact with the top of the stylus sleeve 34 which is disposed a predetermined distance above the top of plate 23 and secondly into an ultimate downward position when the spring 35 in the stylus assembly is compressed, the stylus sleeve 34 is brought to the level of the plate 23 and the pin 12 is lowered to pierce the drawing. The stylus sleeve is biased against the spring 35 and normally reposes in an upward position where the sleeve projects above the level of plate 23 and the stylus sleeve collar abuts against the lower extension of plate 23. The height of the sleeve 34 is adjustable as well as the disposition of the pin 12 by manipulating the set screw 37 in well known manner. The ultimate downward movement is reached when the top of pin 31 is fairly clear of the bottom surface of cover plate 28. In case the assembly is in a central or dead position between two grid positions, the lower end of pin 31 will be engaged by the top of a rack tooth and the top of the locating pin 31 will be engaged by the cover plate 28 and prevent the carriage from moving down into a reading position. In such case the operator is required to more closely approximate the position of the point manually, thus preventing a reading error when the stylus is carelessly located.

The stylus assembly is disposed on the stylus operator 33 and comprises the stylus sleeve 34 wherein the stylus 12 is inserted axially. The sleeve is biased on spring 35 between the head 34 and the adjustable collar 36. The collar 36 is located and fixed by the screw 37 so that the head 34 will project above the surface of the plate 23 a sufficient distance to provide for piercing the drawing which rests on the resilient pad 13. The screw 37 is arranged to adjust also the height of the stylus 12 to give clearance when the point is moved about over the drawing and low enough to effect the piercing thereof when the sleeve 34 is fully depressed.

The template 15 is mounted between two guides 38 which are oppositely mounted on the front and back plates 21 and 22. A cover 39 is mounted on the tops of the front and back plates over the solenoid. Another cover 40 is mounted around the assembly to protect the lower parts, the cover on assembly 10 being formed to extend over and protect the stylus operator as illustrated in FIG. 7.

Referring to FIG. 5, the Y axis carriage 41 is provided with ball bearing mounting 20 which rolls along rod 8. The right angularly disposed rods 9 are mounted in a plate 42 which is carried and secured to the rear edge of the carriage 41. The mounting for template 15 is mounted on the plate 41 and is similar to the mounting of template 14. At one side of intermediate plate 26 of the pin slide assembly is adjustably mounted the limit switch operating rod 43 which carries at its upper end an operating block 44 for contacting and operating the switch button of double throw limit switch 45 when the carriage has reached a lowered position. When the carriage starts to lower the switch button on limit switch 47 is operated by lowering the rod 46 which is mounted fixedly on the plate 26. Rods 43 and 46 are held in place by the set screws 47*a* which may be loosened for adjusting the rods to proper height. The switch operator 44 is adjusted to operate switch 45 at the ultimate lower level of the carriage but other adjustments may be made. The circuits affected by the operation of these high and low limit switches will be described hereinbelow. The limit switches 45, 47 and 48 to 71 are mounted on the top yoke 24 and are stationary.

The limit switches 48 to 71 are operated by the push rods 72 which are mounted in the push rod retaining blocks 73. The blocks 73 are biased by springs 81 between the blocks and the pin slide plate 26. When the assembly is moved to a point on the drawing 13 and plate 26 is lowered for sensing the position, some of the rods 72 will register with perforations in the template and others will encounter the template. Those in register will continue to pass through the perforations and will be lowered with the carriage out of contact with their switch buttons and their corresponding limit switches will be operated. Those push rods 72 which encounter the surface of the template will be retained in their initial or normal positions by the expansion of springs 81.

Referring to FIG. 6, the push rod may be attached to and secured to the retaining block by any convenient means as by welding. The retaining block 73 is latched on one side by a retaining lever 74 which engages a notch in the side of the block. The latching part of the lever has a cam face which engages the notch and pushes the lever into disengagement therewith, as indicated by dotted line when the carriage is lowered to engage the cam face *74a* in the plate 23. The latch 74 is also arranged to engage the bottom edge of the block 73 as illustrated on the right side of FIG. 6 for retaining the push rod in its up-most position until it is released by an encounter with the cam *74b*. The latches 74 are held in engagement with the blocks 73 by the springs 75 which are retained in bore holes in the part 26. On the opposite sides the blocks 73 are retained by the comparing levers 76 which are hinged on pins *76a* in the pin slide 77. Guide pins 79 support the comparing slide 77 on the slide assembly 26 and springs 80 biased between the bottom surface of the assembly and the top of the comparing slide hold the slide down. The comparing lever 76 makes contact on the side with the block 73 in an indented cam face which matches the cam of the end of lever 76. These matching cams are shaped so that a displacement of block 73 vertically will shift lever 76 and operate the button of switch 78, which is the comparing limit switch.

When the solenoid 29 is energized, the push rod 30 descends against the cover plate 28 of the pin slide assembly 26 and the pin slide assembly is lowered. A short distance before the end of the down travel of the carriage, the comparing slide 77 will encounter the bottom pin guide 23 and stop the travel of slide 77. The ends of the retaining levers 74 will contact the cam faces *74a* and *74b* on the bottom pin guide 23 and move the levers into positions indicated by the dotted lines in FIG. 9, thereby releasing the block 73 on one side. The push rods 72 will now move down compressing springs 81. If there is a machine perforation in the template 15 the push rod will enter the same, otherwise the downward movement of the rod will be arrested by encountering the top surface of the template. Any of the push rods 72 which is similarly displaced will displace the retaining block 73 and operate the comparing switch 78. Information is thus recorded only when switch 78 is operated. When a comparing switch is not operated, no push rod 72 will have changed its position in head assembly 7 or 10. At the end of the down stroke (FIG. 5) the limit switch operating block 44 operates the pin slide limit switch 45. This interrupts the current connection to solenoid 29 and allows the springs 27 (FIG. 7) to move the pin slide assembly 26 to its initial position. The springs (FIGS. 6 and 9) then move the push rod retaining lever 74 into the detents of the push rod retaining blocks 73 and lock the push rods in position to be memorized when they are returned with the pin slide assembly.

All push rods 72 which have found a matching hole in the template 15 are locked in the lower position as indicated on the left side of FIG. 6; and all push rods which did not find a matching hole in the template are locked in the upper position as indicated on the right side of FIG. 6. The push rods in the higher positions operate limit switches 48 to 71 when the pin slide assembly is returned to its normal position. The switches 48 to 71 are normally closed and when they are operated by push rods 72 they are held open. In this manner the unoperated switches 48 to 71 are able to carry electric current. This feature is employed to transfer the position information to the card or tape through an electric stepping switch, electric relays and the electric tape perforating unit 5 (FIG. 1) as described hereinbelow in connection with the circuit diagrams.

When the pin slide assembly 26 is moved up the limit switch operating rod (FIG. 5) 46 will operate the pin slide limit switch 47. This starts the transfer of the positioning information to the card or tape. In as much as the pin slide assembly 26 moves the push rods up and out of the template 15 and the push rod retaining lever 74 locks the push rods 72 in position to memorize the positioning on the tape, the operator is enabled to move the heads 7, 10 and the stylus 12 to a new reading position as soon as the information is transferred to the tape. This shortens the operator's time. An electric interlock will be described which will prevent the operator from instituting a new reading cycle before the transfer of a previous reading is completed.

FIG. 11 is an enlarged view of the front panel of the operator's console. On the bottom is a toggle switch 82 in the main power supply alternating current line and beside the switch is a lamp 83 which lights up when the power is on. Switch 84 marked "Tape Feed." When operated this switch causes the tape and punch holes to be transported a distance from channel 1 to channel 7 of the tape. This is a code which may be varied at will. The "tape feed" code is used to provide the tape with an end portion for starting purposes, and also to eliminate any wrong information recorded on the tape. Switch 85, marked "Manual" and "Automatic" controls the use of the manual cycle circuit and that which operates automatically. The information dialed by operating the selector switch, marked "Drill Unit and Program Stop" 86 is entered once after each operation of the tape feed switch 84, and represents on the tape the start of new taped information. When the letter "M" is dialed by selector switch 86 the information programmed directs the program reader of the drilling machine to stop reading the tape. Any information dialed by the selector switch 86 will be entered on the tape whether manual or automatic circuits are employed. If desired the information dialed by switch 86 may be entered with every group operation entered on the tape. Other than the code provided by the templates may be entered on the tape by the use of the switch 86. The operations programmed by the use of this machine may be applied to many different kinds of operational procedures.

The electrical connections used to prepare the programmed information are shown in FIGS. 12A, 12B, 12C and 12D. For the purposes of reading these circuits, place FIG. 12A at the top left, 12B at the top right, 12C at the bottom left and 12D at the bottom right.

Electrical parts in the "X"-head assembly 10 and in the "Y"-head assembly 7 are identical, but where identical parts are individually identified an "X" prefix is used to refer to parts in the "X" assembly and a prefix "Y" is used to refer to the part in the "Y" assembly. Different levels of the stepping switch and the manual input switches, and the contacts in the stepping switch and relays have letters as suffixes.

*The Automatic Cycle.*—For punching a tape having eight channels a stepping switch having six levels is employed in the circuit described. In the following description the entire circuits and operations of only two levels of the stepping switch are described. It is to be understood that the circuits and operations of the other levels are identical to the ones described. Alternating current is supplied from a power source through main power switch 82 which in its closed position causes lamp 83 to be illuminated, starts the tape perforating drive motor 100 in the perforating unit 5, illuminates the lamps 99 in the lamp compartment within the knee hole space 4 and supplies current to the current rectifier 101. From this point direct current is employed. For providing the tape with a lead end for feeding the same into the tape reader, the tape feed switch is manually operated. Closing the tape feed switch 84 energizes relay 102 and closes relay contacts **102*a* to 102*g* and energizes solenoids 103 to 109. These solenoids will latch in the perforating punches (not shown) for channels 1 to 7 in the tape perforating unit 5. Energized relay 102 closes contact 102*h* and energizes solenoid 111 which latches in the single revolution clutch (not shown) in unit 5 which operates the punch, powered by motor 100. The closed tape feed switch 84 also supplies current to lead 121, rectifiers 136, 137 and 138 and to relays 130, 131 and 135. These relays close contacts 130*a*, 131*a* and 135*a*. The relay 130 thus operates to make certain that the next operation to be programmed by the push rods 72 (FIG. 6) along the "X" axis in conjunction with the template 15 will be entered on the tape whether or not the position is the same as the one programmed, thus preventing the comparing limit switch 78*a* from being operated. The relay 131 operates in the same way for the next "Y" position and relay 135 operates similarly to close contacts 135*a* and the selector switch 86**.

Turning the switch indicator to "Automatic" closes switches 85, energizes relay 124 and closes contacts **124*a* (FIG. 12C) and 124*k* (FIG. 12D), thereby supplying current to connections for entering position information on the tape from the "X" and "Y" head assemblies 7 and 10. The normally open connection 18*a* is closed by opearting push button 18 when a point to be programmed is located, and relay 125** is energized by current connected through limit switches *x*45 and *y*45. Relay 125 being thus energized will close contacts **125*d*, energize relay 127 and close contact 127*a*. Contacts 127*a* will establish the current supply for operating stepping switch 32 for stepping off the homing position and the information stored in the "X" and "Y" heads 10 and 7 after the pin slide assemblies X–26 and Y–26 have moved down to reading position and returned to normal position. Then operating the button 18 (PB–1) the contact 18*b* will close and energize relay 126, closing contacts 126*a* (FIG. 12A), thereby supplying current to and energizing solenoids X–28 and Y–29. Thereupon the "X" pin slide assembly and the "Y" pin slide assembly will move down. Upon the operation of push button 18, contact 18*c* closes and supplies current to solenoid 18*d* which is built into the push button, and will thus keep the push button operational. The lamp 18*e* will be illuminated as long as the push button is operated as an indication of the operation. Both head assemblies 7 and 10 will be accurately located by seating the locating pin 31 in the rack, and the push rods 72 will have sensed the locating position by entering the proper holes in the templates 14 and 15**, or stopping on top of the templates when no hole is in register with a rod.

Figure 12A:
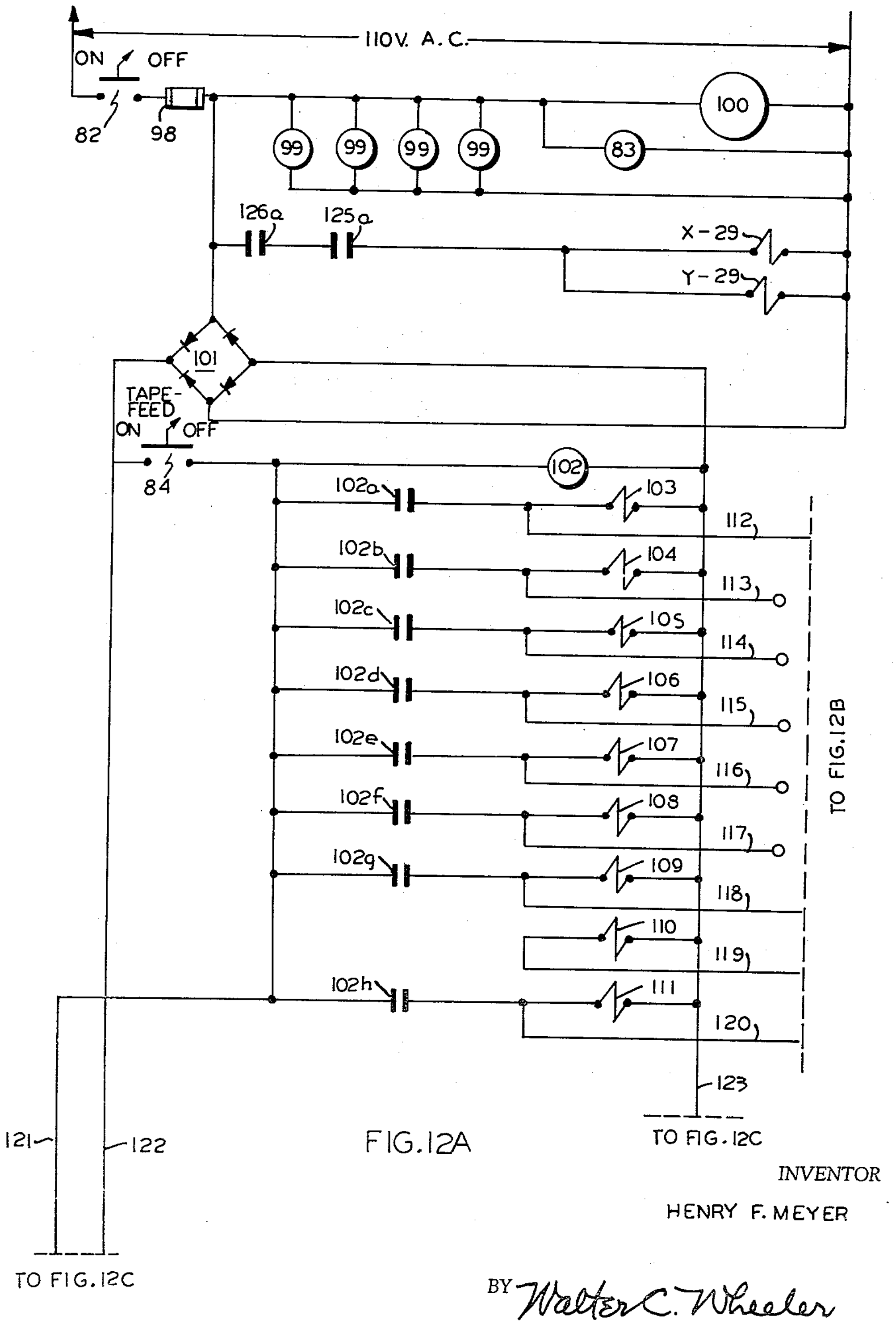
Figure 12B:
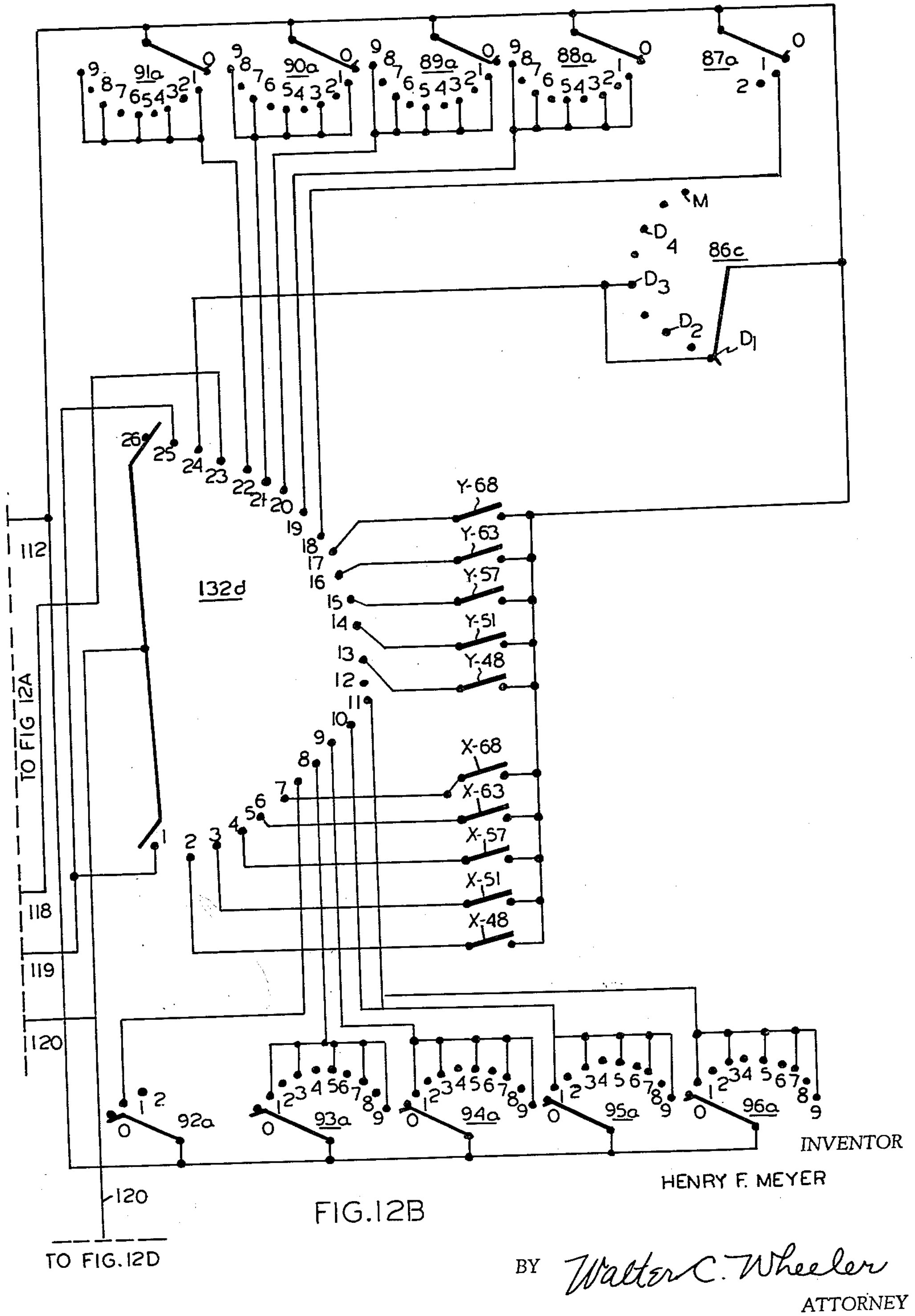
Figure 12C:
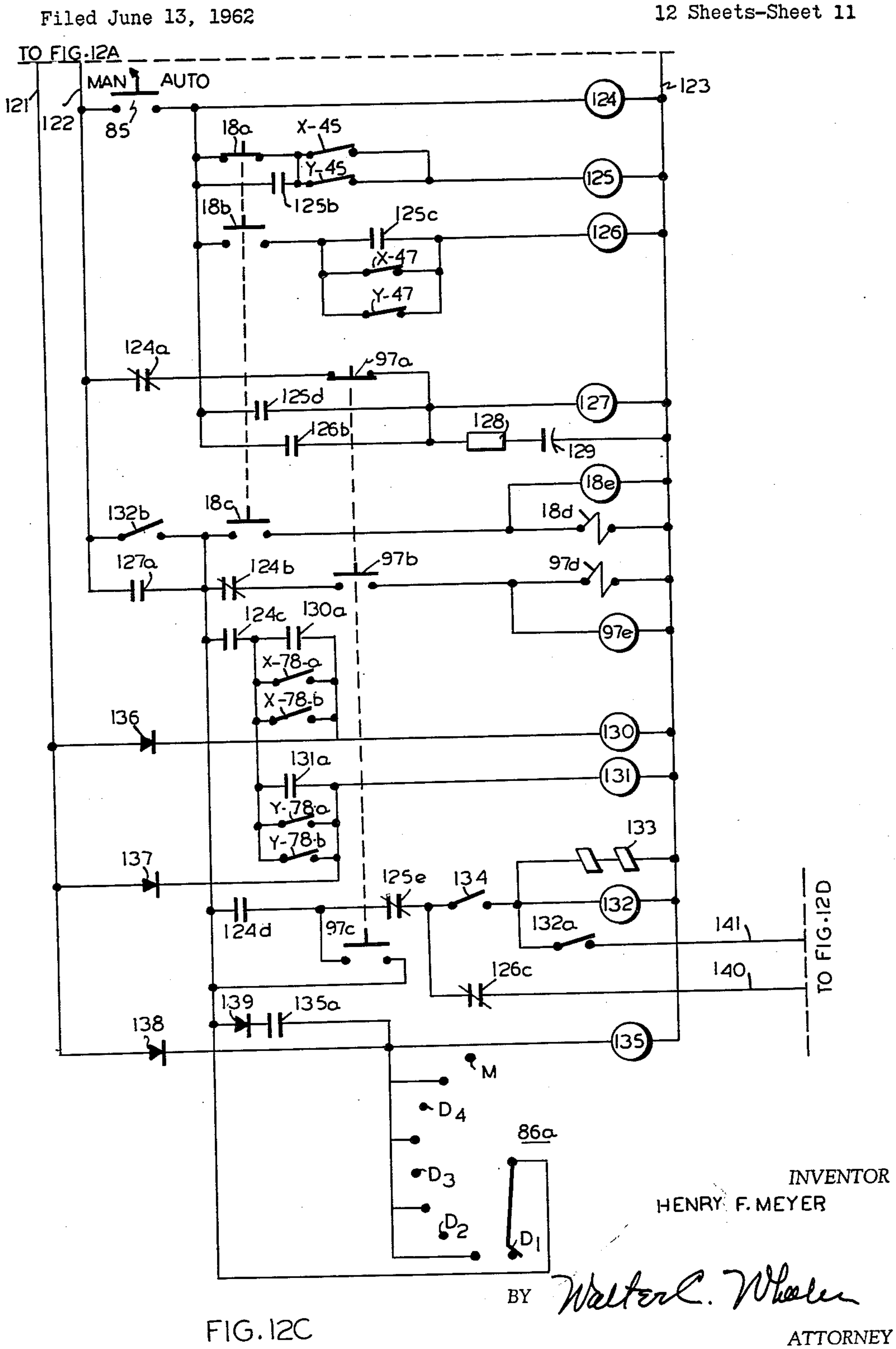

At the end of the down stroke the limit switch operating block 44 which is fastened to the operating rod 43 will lower and open the limit switches X–45 and Y–45 (FIG. 5 and FIG. 12C). This interrupts the current supply to relay 125 when both switches X–45 and Y–45 have been operated. The contact **12*a*** (FIG. 12A) interrupts the current supply to solenoids *x*29 and *y*29 so that the springs 27 (FIG. 7) can return the pin slide assemblies 26 to the top or normal positions. The limit switches X–47 and Y–47 (FIG. 5) being out of contact with rod 46 when the carriage is moved down, these switches keep relay 126 energized. Contact **126*b* keeps relay 127 energized and contact 125*d* is opened. When both pin slide assemblies 26 are returned to top position, the limit switch operating rods 46 operate limit switches X–47 and Y–47** to open position.

Opening contacts **126*b* interrupt the current to relay 127. However the capacitor retains enough current to energize relay 127 temporarily, or until the relay coil is discharged through the ground wire, and resistor 128 which provides a time delay sufficient to permit the stepping switch to step off the homing position. Then closing switch 132*b* will close the circuit and supply current previously supplied through contacts 127*a*. Deenergizing relay 126 closes contacts 126*c* and supplies current over wire 140 and 141 to level 132*c* of stepping switch 132. The current flows over homing contact 26 of this level, contact 127*b*, wire 141, interrupter contact 132*a* and energizes the stepping switch coil 132. The ratchet pawl of the stepping switch will engage the next tooth of the ratchet drive. The interrupter switch 132*a* will open at the end of the movement and deenergize the stepping switch coil 132. This will allow the spring of the stepping switch to move the wipers of all levels of the switch to the next contacts. The stepping switch is now disconnected from the homing position and the wiper is resting on contact #1 of all levels, thereby to carry current from wire 140 over contact #1 of stepping switch level 132*c*, contact 124*f* and 130*b* to wire 120 which will energize clutch solenoid 111** (FIG. 12A) for one revolution of the tape punch, for punching one line of information across the tape.

Wire 120 is also connected to the wiper of the stepping switch level **132*d*. Current will flow over contact #1 to wire 112 and energize solenoid 103 which will latch in the perforating punch for channel 1. Wire 120 is also connected to the wipers 132*e***, *f*, *g*, *h* and *i*. These levels operate in the same manner as level *d*. Wire 120 will energize solenoid 104 (FIG. 12A) by current through contacts of level **132*e* and wire 113 to produce holes for channel 2. Level 132*f* will operate to energize solenoid 104 for making holes in channel 3**. Level *g* operates through solenoid 106 for making holes for channel 4 and so on. The ability to supply current to solenoids 103 to 110 thus identifies a letter or number. The code necessary to be produced with contact #1 of all stepping switch levels has to be the code for reading "X" as address for the "X" position information.

A switch operating cam (not shown) fastened to the tape punch shaft is disposed to close limit switch 134 soon after the shaft starts to turn, thus to energize the stepping switch coil 132. The limit switch 134 is allowed to open again before the revolution is completed. The opening of switch 134 stops the stepping switch on the next set of contacts. When limit switch 48 is not operated by a push rod 72, wire 112 will only energize punch latch solenoid 103. All other #2 contacts in other stepping switch levels are connected to their limit switches and punch latch solenoids in the same way. If the push rods 72 for the corresponding limit switches find a hole in the template will determine whether or not the limit switches are operated, and whether or not a hole will be punched in the tape for that particular push rod, or template position. Contacts numbers 3 and 4 of all stepping switch levels will operate in the same way for the second and third digits of the "X" position. The fourth digit of the "X" position is connected to contact #5 in all levels of the stepping switch. When the reading signifies a "Zero" for a position, it is not necessary to enter this information on the tape because all missing digits at the end of the position information will be automatically set up by the drilling machine as a "Zero." To accomplish this effect, the limit switch X–67 (FIG. 12D) representing "Zero" for the fourth digit of the "X" position is connected to contact #5 of stepping switch level **132*c***. When the push rod 72 for this limit switch finds a hole in template 15 at a reading position, this limit switch will not be operated. Contact *x–67–b* will then energize the stepping switch coil 132 over wire 141 and interrupter contact 132*a*. This will step the stepping switch without energizing a punch or clutch solenoid in the tape punching unit. The same set up is provided for contact #6 for the fifth digit of the "X" position over stepping switch level 132*c*. Here limit switch X–71 represents the fifth "Zero" digit. Should there be no hole in the template 15 for the push rods 72 of these limit switches, the switches will be operated and contacts *x–67a* and *x–71a* will make connection to wire 120 instead of wire 141, the clutch and punch solenoids will be energized in the tape punch unit and the code information of the other stepping switch levels will be entered on the tape.

Contacts 7, 8, 9, 10 and 11 are used for manual input information and are connected at level 132*c* by contact 124*k* of the manual automatic selector relay to wire 141. This permits the stepping switch of level 132*c* to step over these contacts without making a reading. Contact #12 of stepping switch 132*c* is connected over contact 124*h* and 131*b* to wire 12*o*. The code for "Y" will be entered by this connection. Contacts #13, #14 and #15 represent the first, second and third digits of the "Y" position information and contacts #16 and #17 represent the fourth and fifth digits. Whether or not the fourth and fifth digits are entered on the tape is determined, as before by the "Zero" switches Y–67 and Y–71. Contacts 18, 19, 20 21 and 22 are used for manual input information and are connected at level 132*c* by contact 124*k* to wire 141 and permit the stepping switch to step over these contacts without reading.

Figure 12D:
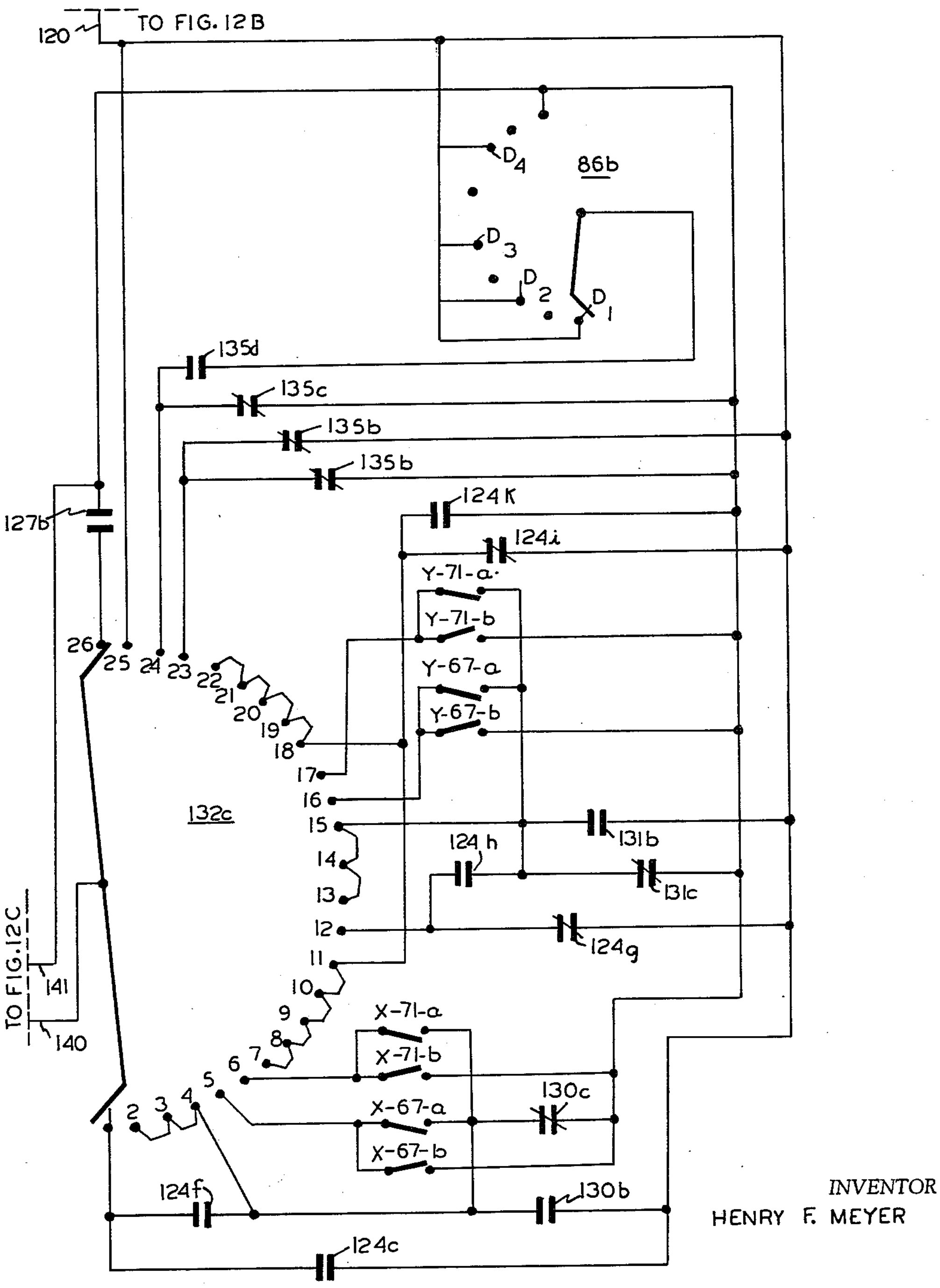

Contacts 23 and 24 are used for auxiliary information input. When relay 135 is energized current will be directed over contact #23 at level 132*c* and contact 135*b* to wire 120 for a reading cycle. Contact #24 at level 132*c* will direct the current over contact 135*d* to the wiper of "Drill Unit" and "Program Stop" selector switch level 86*b* (FIG. 12D). D1 to D4 of selector switch 86 (FIG. 12C) will direct the current to wire 120 for reading the code for the contacts 1, 2, 3 and 4 of level 132*d*. If "M" is selected by switch 86 the wiper of level 86*b* will direct the current to wire 141 and let the stepping switch 132 step without reading, because no number code is required with an "M" information. Contact #25 of level 132*c* will direct the current to wire 120 for punching the code for "End of Line" information. The latter code is employed to start a drilling cycle.

Contact #26 of level 132*c* is not able to direct the current anywhere because relay 127 is not energized at this time and contact 127*b* is open. In this position the stepping switch 132 is operating the homing switch 132*b*. This will interrupt the current flow to the latch coil 18*n* and lamp 18*e* of the push button 18 (PB–1). The push button will ascend and the lamp will be extinguished. The programmer is now in readiness for a new reading cycle. Upon opening the homing switch contact 132*b* the relays 130, 131 and 135 are no longer enabled to seal themselves in and they will deenergize.

Relay 130 may now be energized only when in the next reading cycle a push rod 72 in the "X" head assembly 10 is displaced and operates along with the cam curve on the push rod retaining block 73 over the comparing lever 76 limit switch *x–78a* or *x–78b*. Should no push rod be displaced in this reading cycle the reading position of this head assembly will be the same as the last one, and the position information will not necessarily be repeated. The normally closed contact 130*c* will then direct the current from contacts 1, 2, 3, 4, 5 or 6 to stepping switch level 132*c* to 141. The stepping switch will step past these contacts without reading. The same procedure will occur with relay 131 for information in the "Y" position.

The relay 135 for auxiliary information will be energized when a new information is dialed by selector switch 86. The wiper on level 86*a* (FIG. 12C) will energize relay 135 momentarily in an intermediate position between two stops, and this will operate to seal itself in over its contact 135*a*. When 135 is not energized, contacts #23 and #24 of level 132*c* will be connected during a reading cycle to wire 141 and let the stepping switch 132 step over these contacts without reading. The diodes or rectifiers 136, 137, 138 and 139 serve to prevent a feed back of current to energize relays 131 and 135 when relay 130 is energized by the operation of comparing limit switch *x–78a* or *x–78b*. This will work in the same manner as relays 131 and 135, and allow for separately energizing relays 130, 131 and 135.

*Manual Operation.*—For manual operation the selector switch 85 will be turned to "Manual Operation" position. This will open the switch contacts 85 and deenergize relay 124. Relay 127 will now be energized through contact 124*a* and the closed contacts 97*a* of the push button 97 (PB–2) (FIGS. 1 and 11). Operating the push button 97 will close contact 97*b* and hold the push button with the latch coil 97*d* in the "operated" position, and the glow lamp 97*e* will be illuminated. Current will now be supplied over contacts 97*c*, 125*e*, 126*c*, 140, #26 in level 132*c*, 127*b*, wire 141, interrupter switch 132*a* to the stepping switch coil 132 and let the stepping switch step off the homing position. Contact #1 in level 132*c* will then supply current over contact 124*e* to wire 120 and let the code for the letter "X" be recorded in the tape. The contacts #2, #3, #4, #5 and #6 of the level 132*c* will be connected over contact 130*c* to wire 141 and the stepping switch 132 will over step these contacts without stopping for a reading. Contacts #7, #8, #9, #10 and #11 of level 132*c* will be connected over contact 124*i* to wire 120 and will be read, and the codes for five digits for the "X" position entered into the tape. To determine the right codes required for these five digits the code levels 132*d*, *e.*, *f*, *g*, *h* and *i* have their contacts #7, #8, #9, #10 and #11 connected to corresponding levels of the manual selector switches for the "X" axis, 92, 93, 94, 95 and 96. The codes for the selected numbers will be supplied to the punch latch solenoids 103 to 110 depending upon which of the contacts the wiper rests. Contact #12 of level 132*c* is connected over contact 124*g* to wire 120 to read the code for the letter "Y." Contacts #13, #14, #15, #16 and #17 are connected to wire 141 over contact 131*b* and these are stepped over without reading. Contacts #18, #19, #20, #21 and 22 are connected to wire 120 over contact 124*i* for supplying five digits for the "Y" position. Contacts #23, #24 and #25 of level 132*c* will work the same in manual operation as in automatic operation. Contact #26 is the homing position. Homing switch 132*b* will be opened in this position and interrupt the current for the latch coil 97*d* and light 97*e*. The push button 97 (PB–2) will return to the normal elevated position and the light will be extinguished. The programmer is now ready for a new cycle. An "M" selected by the auxiliary function selector switch 86 together with the last position information, manual or automatic, will be read by the operated machine as a program stop. The machine will position to these dimensions and then stop. This will be considered as a loading and unloading position for the work piece.

I claim:

1. A device of the kind described which comprises a pair of push rod assemblies; a track oriented in a plane along an axis; means for reciprocating one of said assemblies from side to side along said track; another track oriented in said plane at an angle to said first named track; means for reciprocating both assemblies along said other track; each of said assemblies comprising a push rod carriage mounted to reciprocate up and down; a group of push rod retaining blocks appended to each of said carriages; a push rod secured to each of said blocks; templates having perforations therein arranged in accordance with a numerical positioning code; one of said templates being disposed opposite each push rod assembly and at the ends of the push rods so that selected perforations will be in alignment with some of said rods when said assemblies are manipulated into selected positions and other rods will be out of alignment with perforations in the templates; means on one of said carriages for locating said selected positions to be programmed; means on each of said carriages for bringing said push rods into alignment with said selected perforations in the templates; relay activating means in said assemblies disposed to be operated by the rods which are brought into alignment with said selected perforations; means for motivating said carriage, thereby to displace the push rods that are in alignment with said selected perforations and motivate said relay activating means; a recording device; impressing means in said recording device for producing a program record; electrical means coordinated with said rods for activating selected impressing means numerically positioned in accordance with said displaced push rods; and means activated by the displaced push rods for activating said corresponding impressing means.

2. A device in accordance with claim 1 which comprises means on one of the assemblies for identifying programmed positions.

3. A device in accordance with claim 1 in which the means for reciprocating the assemblies comprises a manually operable handle on one of the assemblies; and the means for motivating the carriage comprises a switch operating means on the handle.

4. A device in accordance with claim 1 in which the means for bringing the push rods into alignment with selected perforations in the template comprises racks having teeth associated with the templates, said teeth being in alignment with said perforations; and aligning pins on the carriages disposed to engage the rack teeth nearest the selected perforations.

5. A device in accordance with claim 1 in which the means for motiivating each carriage comprises a solenoid, a solenoid power supply circuit and an upper and a lower limit switch in said solenoid circuit; and means movable with said carriage for operating said upper limit switch when said relay operating means are operated; and means movable with said carriage for operating said lower limit switch when the carriage is down.

References Cited in the file of this patent

UNITED STATES PATENTS

| | | |
|---|---|---|
| 2,980,319 | Clemens et al. | Apr. 18, 1961 |
| 3,022,501 | Seigle | Feb. 20, 1962 |

UNITED STATES PATENT OFFICE
CERTIFICATE OF CORRECTION

Patent No. 3,122,310 February 25, 1964

Henry F. Meyer

It is hereby certified that error appears in the above numbered patent requiring correction and that the said Letters Patent should read as corrected below.

Column 4, line 8, for "the", first occurrence, read -- two --; line 59, for "Y" read -- "Y" --; column 5, line 58, for "machine" read -- matching --; column 6, line 20, for "In as much" read -- Inasmuch --; column 9, line 23, for "12o" read -- 120 --; line 30, after "20" insert a comma; column 10, lines 40 to 41, for "switches for the "X" axis, 92, 93, 94, 95 and 96" read -- switches 92, 93, 94, 95 and 96 for the "X" axis --; line 48, for "22" read -- #22 --; column 12, line 13, for "motiivating" read -- motivating --.

Signed and sealed this 21st day of July 1964.

(SEAL)

Attest:

ESTON G. JOHNSON
Attesting Officer

EDWARD J. BRENNER
Commissioner of Patents